US008870295B1

(12) United States Patent
Pope et al.

(10) Patent No.: US 8,870,295 B1
(45) Date of Patent: Oct. 28, 2014

(54) CARGO HAULING ATTACHMENT FOR A TRACTOR

(76) Inventors: Eric O. Pope, Wooster, OH (US); Thomas Jarvis, Mount Eaton, OH (US)

( * ) Notice: Subject to any disclaimer, the term of this patent is extended or adjusted under 35 U.S.C. 154(b) by 158 days.

(21) Appl. No.: 13/271,423

(22) Filed: Oct. 12, 2011

Related U.S. Application Data

(60) Provisional application No. 61/404,774, filed on Oct. 12, 2010.

(51) Int. Cl.
*B60P 1/24* (2006.01)

(52) U.S. Cl.
USPC .............................. 298/17 T; 298/1 C; 298/5

(58) Field of Classification Search
USPC ...... 298/1 C, 5, 6, 10, 22 R, 17 T, 17 SG, 38; 414/482, 483
See application file for complete search history.

(56) References Cited

U.S. PATENT DOCUMENTS

| 2,718,431 | A | * | 9/1955 | Pietroroia | 298/22 R |
| 2,738,222 | A | * | 3/1956 | Needham | 298/14 |
| 2,894,785 | A | * | 7/1959 | Yackel | 298/22 R |
| 5,921,743 | A | * | 7/1999 | Slagter | |
| 7,448,691 | B2 | * | 11/2008 | Brooks | 298/17 T |
| 2007/0187124 | A1 | | 8/2007 | McFarland et al. | |

OTHER PUBLICATIONS

Ventrac Attachments, www.ventrac.com, Venture Products, Inc. 2008. 2 pages.

* cited by examiner

*Primary Examiner* — Stephen Gordon
(74) *Attorney, Agent, or Firm* — Renner, Kenner, Greive, Bobak, Taylor & Weber (57) ABSTRACT

A cargo hauling attachment includes a frame and a bed hingedly secured to the frame. The frame is rigidly attached to the front of a tractor and the bed is pivotable relative to the frame by a linear actuator. A pair of freely rotating wheels is provided beneath the frame to support the attachment and to improve maneuverability of the attachment. A lift gate having multiple dual motion hinge assemblies may be provided in certain embodiments.

7 Claims, 13 Drawing Sheets

CARGO HAULING ATTACHMENT FOR A TRACTOR

This application claims priority from U.S. Provisional Application Ser. No. 61/404,774 filed Oct. 12, 2010, which is incorporated herein by reference in its entirety.

TECHNICAL FIELD

The apparatus of this disclosure relates to a cargo hauling attachment for a tractor or other vehicle. More particularly, the apparatus of the disclosure relates to such a cargo hauling attachment for a tractor wherein the attachment is mounted to the front of the tractor and includes freely rotatable wheels to facilitate maneuvering of the attachment.

BACKGROUND ART

The need for cargo hauling vehicles is present in many industries and activities. The most common type of cargo hauling apparatus is a trailer, which is so called because it trails behind a motorized vehicle. A trailer is often attached to the rear of a tractor or other vehicle to haul cargo for farming, landscaping, and other applications. The trailer usually includes a tongue extending from a front of a cargo carrying bed, the tongue typically being attached to a mounting plate at the rear of the tractor by a pin or other mechanism that allows the tongue of the trailer to pivot relative to the tractor, as is known to those skilled in the art. This pivoting of the trailer relative to the tractor is necessary to allow the trailer to follow the tractor as it turns.

A significant disadvantage to such trailer systems is the difficulty in maneuvering the trailer into a desired location. This is particularly problematic in situations where the trailer dumps rearward to deposit the cargo contained therein at a desired location. It is necessary, in those situations, to back the trailer to the desired point so that the cargo is dumped where needed. In some circumstances, it may be necessary to maneuver the trailer between several closely spaced objects in order to dump the cargo at a desired location. Not only is maneuvering of the trailer difficult when moving in reverse, but it is also difficult for the driver of the tractor to monitor the position of the trailer while moving in reverse.

Thus, there is a need for an improved cargo hauling attachment that alleviates one or more of the disadvantages discussed above.

SUMMARY OF THE INVENTION

It is thus an object of one aspect of the present invention to provide a cargo hauling attachment including mounting arms for rigid attachment to the front of a tractor or other vehicle.

It is an object of another aspect of the present invention to provide a cargo hauling attachment having freely rotatable wheels to allow for easy maneuverability.

It is another object of yet another aspect of the present invention to provide a cargo hauling attachment having a lift gate on a front wall of a bed for containing the cargo, the lift gate capable of pivoting relative to the bed to allow forward dumping of the cargo.

These and other objects of the present invention, as well as the advantages thereof over existing prior-art forms, which will become apparent from the description to follow, are accomplished by the improvements hereinafter described and claimed.

In general, a cargo hauling attachment for a vehicle includes a frame, a bed connected to the frame, and mounting arms extending from a rear of the frame for rigid attachment to the front of the vehicle. Laterally spaced wheels are secured to the frame and are rotatable about a vertical axis for providing maneuverability of the cargo hauling attachment.

According to one or more aspects of the invention, a cargo hauling attachment for use with a tractor includes a frame having a rear end and a front end and a bed connected to the frame by a hinge adjacent the front end. Mounting arms extend from the rear end for rigid attachment to the front of the tractor and a linear actuator is secured at one end to the frame and at an opposite end to the bed for causing pivoting of the bed relative to the frame. Wheels are secured to the frame and are rotatable about a vertical axis for providing maneuverability of the cargo hauling attachment.

According to another aspect of the invention, a method of hauling and dumping cargo includes the steps of loading cargo into a bed of a cargo hauling attachment secured to a tractor, the bed of the cargo hauling attachment being pivotally secured to a frame that is rigidly connected to a front of the tractor. The cargo hauling attachment is then maneuvered into a desired dumping position by pushing the cargo hauling attachment with the tractor to cause rotation of wheels supporting the cargo hauling attachment, the wheels being rotatable about a vertical axis. A lift gate is then opened on a front side of the bed opposite the tractor, a hydraulic linear actuator of the cargo hauling attachment is actuated using the hydraulic system of the tractor to cause pivoting of the bed in a forward direction away from the tractor.

PREFERRED EMBODIMENTS FOR CARRYING OUT THE INVENTION

A cargo hauling attachment made according to the present disclosure is indicated generally by the numeral 10. Cargo hauling attachment 10, as shown in the accompanying figures and described herein, is adapted to be used with a tractor 12. However, it is also contemplated that cargo hauling attachment 10 may be modified for use with other vehicles outfitted with similar attachment receiving mechanisms. While it is contemplated that cargo hauling attachment 10 may be adapted for use with any known tractor, the embodiment depicted is attached to a four wheel steering tractor.

Cargo hauling attachment 10 includes a frame 14 and a bed 16 hingedly attached to the frame 14. Frame 14 may be provided in a variety of configurations and may be made from any material known to those skilled in the art and capable of providing a strong and sturdy base for bed 16. As shown, frame 14 includes a rear rail 18, a front rail 20 and a plurality of laterally spaced cross rails 22. Laterally spaced mounting arms 24 extend from rear rail 18 and are secured to tractor 12. Mounting arms 24 may be secured to tractor 12 by any method or mechanism known to those skilled in the art. However, it is contemplated that mounting arms 24 are rigidly attached to tractor 12 so that frame 14 cannot pivot or turn relative to tractor 12. In certain embodiments, the mounting arms 24 may connect to mating arms on the tractor as part of a quick-connect system, as is known to those skilled in the art. For example, the Ventrac mount system provided on Ventrac tractors and attachments (Venture Products, Inc.) utilizes a suitable quick-connect system where no tools are required for attachment to the tractor. In other embodiments, mounting arms 24 may be connected to the tractor by other mechanisms known to those skilled in the art.

Bed 16 includes a bottom 26, a rear wall 28, a front wall 30, and opposed side walls 32 extending between rear wall 28 and front wall 30. Thus, as will be appreciated by those skilled in the art, cargo to be hauled by attachment 10 is placed in bed 16 on bottom 26 and within rear wall 28, front wall 30 and side walls 32. A plurality of pockets 34 may be formed in rear wall 28, front wall 30 or side walls 32 to allow for the insertion of posts to extend the height of bed 16. Bumpers 35 may extend upward from rear rail 18 or cross rails 22 adjacent to rear rail 18, or may extend downwardly from bottom 26 of bed 16 so as to contact rear rail 18 or cross rails 22 adjacent to rear rail 18. As will be appreciated by those skilled in the art, bumpers 35 may be made of a rubber or elastomeric material to dampen the impact of bed 16 contacting frame 14, and to reduce noise and vibration occurring between bed 16 and frame 14.

A pair of laterally spaced hinge brackets 36 extend upwardly from frame 14 adjacent to front rail 20. Hinge brackets 36 may be attached to front rail 20 or to a portion of cross rails 22 adjacent to front rail 20. Likewise, a pair of laterally spaced hinge brackets 38 extend downwardly from the bottom surface 26 of bed 16 adjacent to front wall 30. A hole 39 is provided through each of the hinge brackets 36, 38, with the holes being aligned when the bed 16 is positioned over the frame 14. A hinge pin 40 is received through holes 39 in hinge brackets 36 and 38 to hingedly connect bed 16 to frame 14. While a particular hinge mechanism is disclosed and described herein, it will be appreciated that various other known hinge mechanisms may be substituted.

At least two wheels 42 are mounted to frame 14 and extend downwardly therefrom. In a preferred embodiment, the wheels 42 are freely rotatable about a vertical axis to provide maximum maneuverability of the cargo hauling attachment 10. Thus, wheels 42 are capable of 360° rotation about the vertical axis to allow cargo hauling attachment 10 to easily move in any direction as dictated by movement of the tractor. Wheels 42 may be mounted at any desired location on frame 14, but are shown mounted at the lateral ends of front rail 20. Wheels 42 may be mounted by any method or mechanism known to those skilled in the art without deviating from the scope of the present disclosure, and may include bearings to facilitate the free rotation of the wheels.

A linear actuator 44 is mounted to frame 14 adjacent rear rail 18, and is secured at the opposite end to bottom surface 26 of bed 16. As will be appreciated by those skilled in the art, actuation of linear actuator 44, and any extension thereof, causes bed 16 to tilt relative to frame 14 by pivoting at hinge brackets 36 and 38. Likewise, retraction of the arm of linear actuator 44 causes bed 16 to return to the unactuated position. Any type of linear actuator known to those skilled in the art may be utilized with the cargo hauling attachment 10 of the present disclosure. In certain embodiments, a hydraulic linear actuator may be employed and may include a high pressure hydraulic fluid source. The high pressure hydraulic fluid source may be the hydraulic system of tractor 12.

Figure 1A:
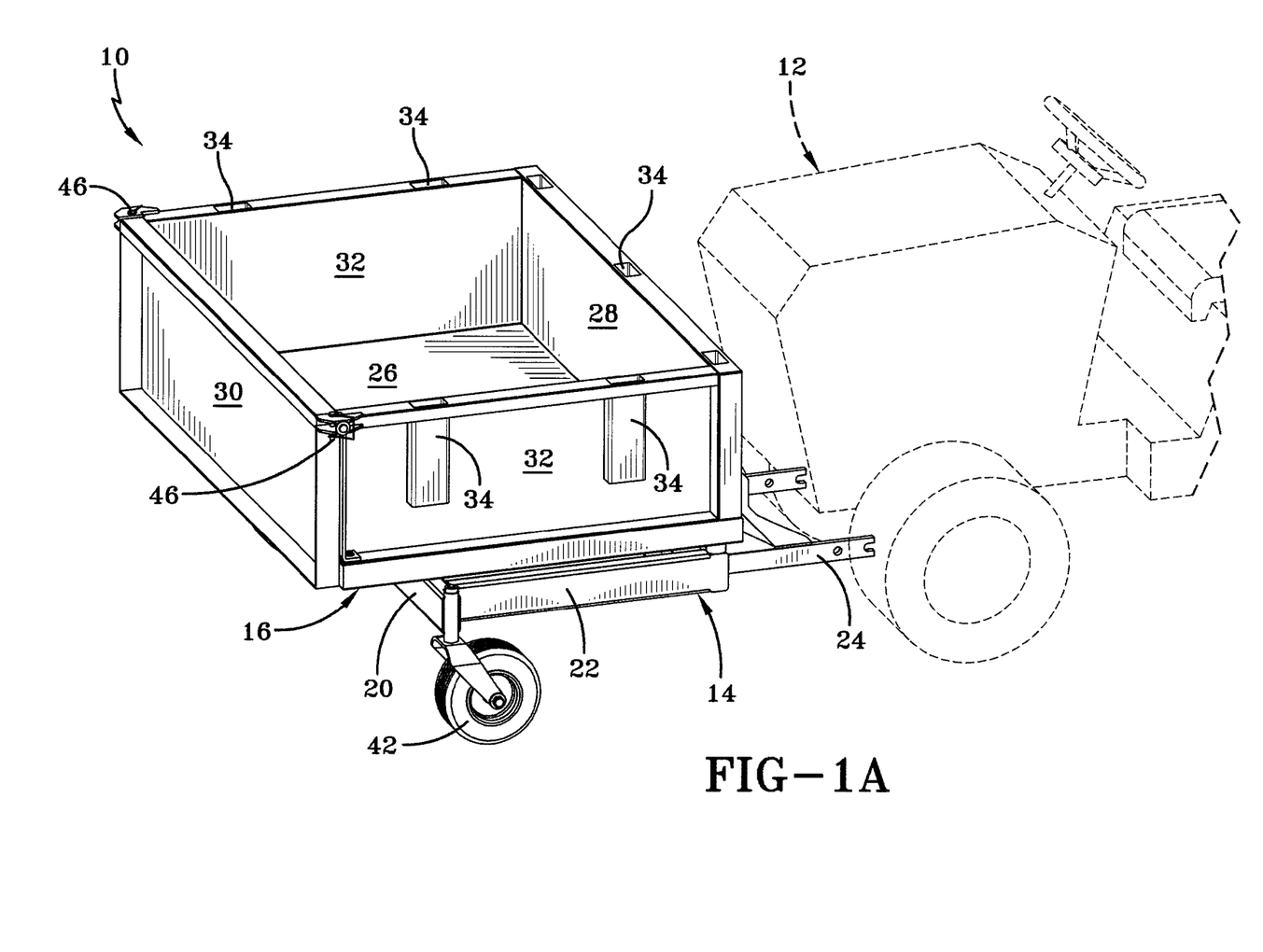
FIG. 1A is a perspective view of a cargo hauling attachment for a vehicle according to the concepts of the present disclosure with the lift gate in a closed position.
Figure 1B:
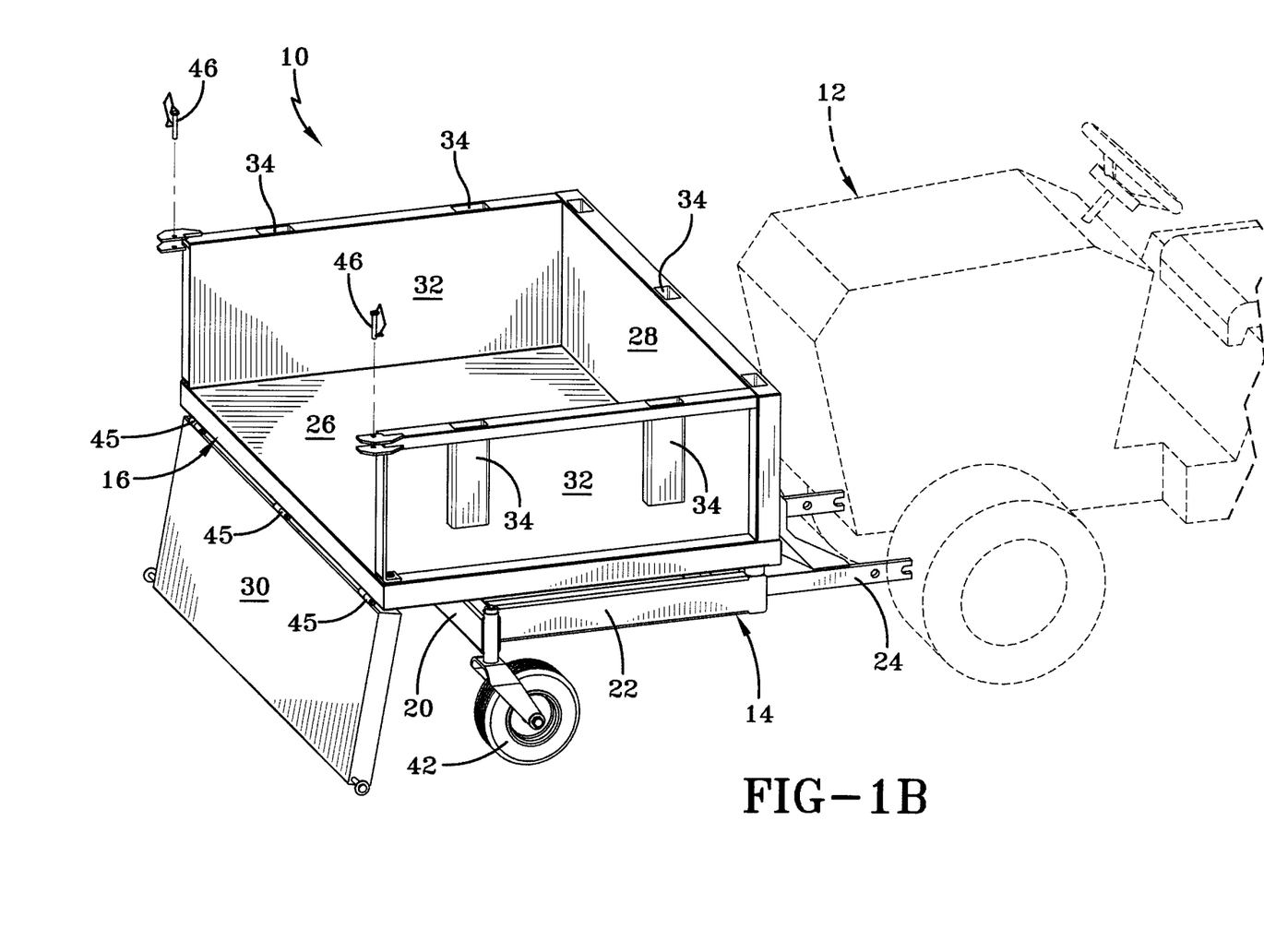
FIG. 1B is a perspective view of the cargo hauling attachment of FIG. 1A with the lift gate in an open position.
Figure 2:
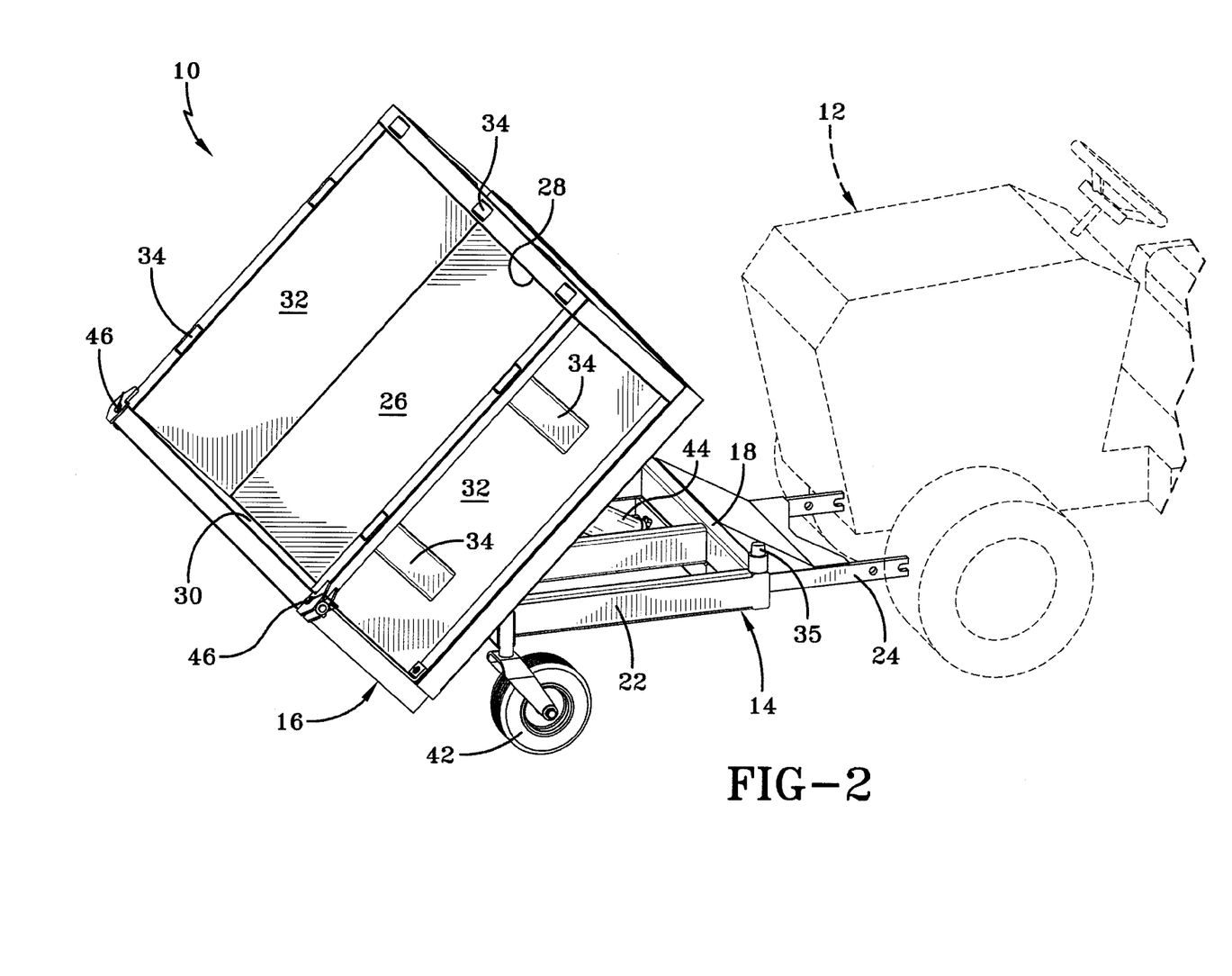
FIG. 2 is a perspective view of the cargo hauling attachment of FIG. 1A in a dumping position.
Figure 3:
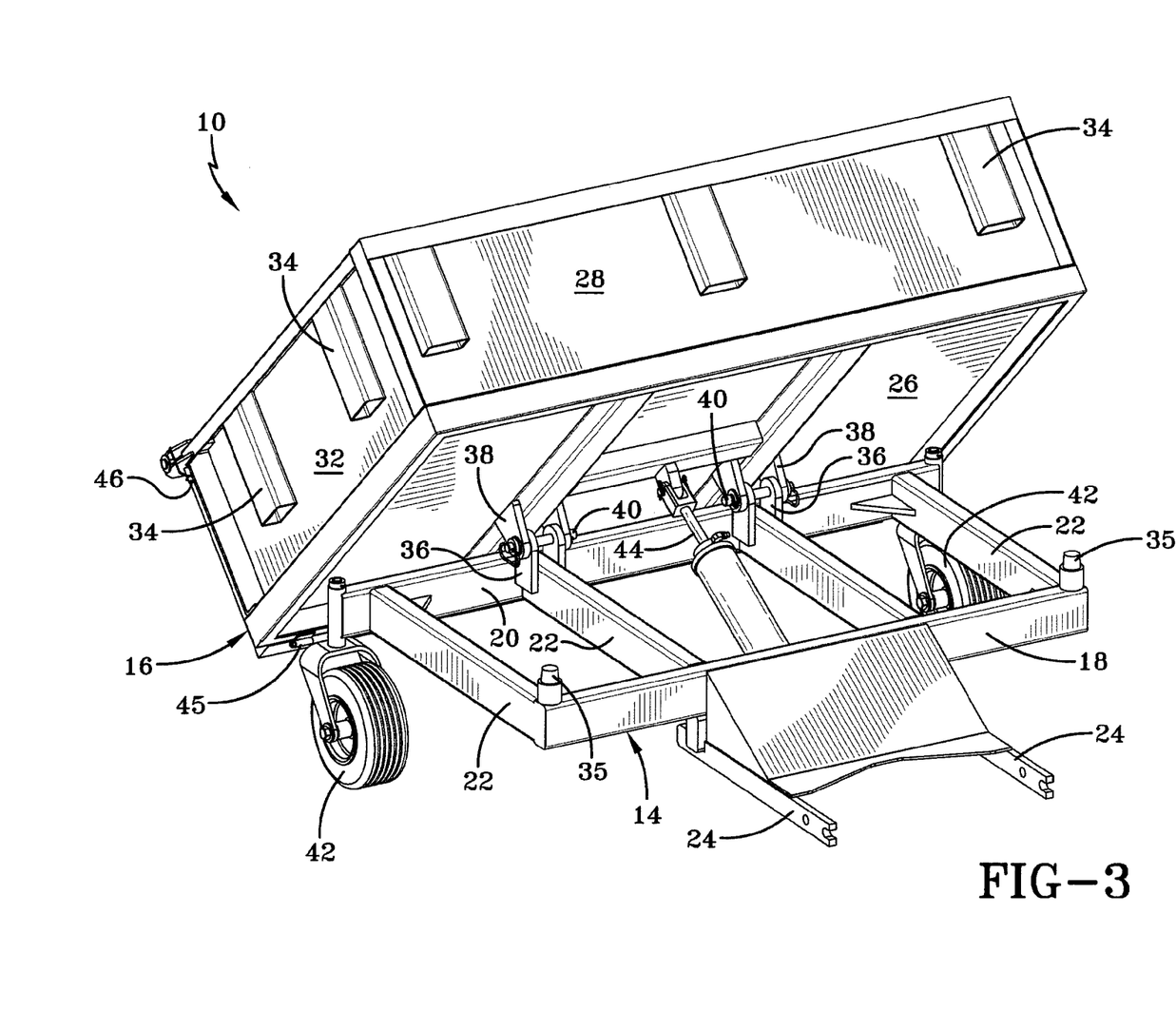
FIG. 3 is a perspective view of a hinge and dumping mechanism of the cargo hauling attachment.
Figure 4:
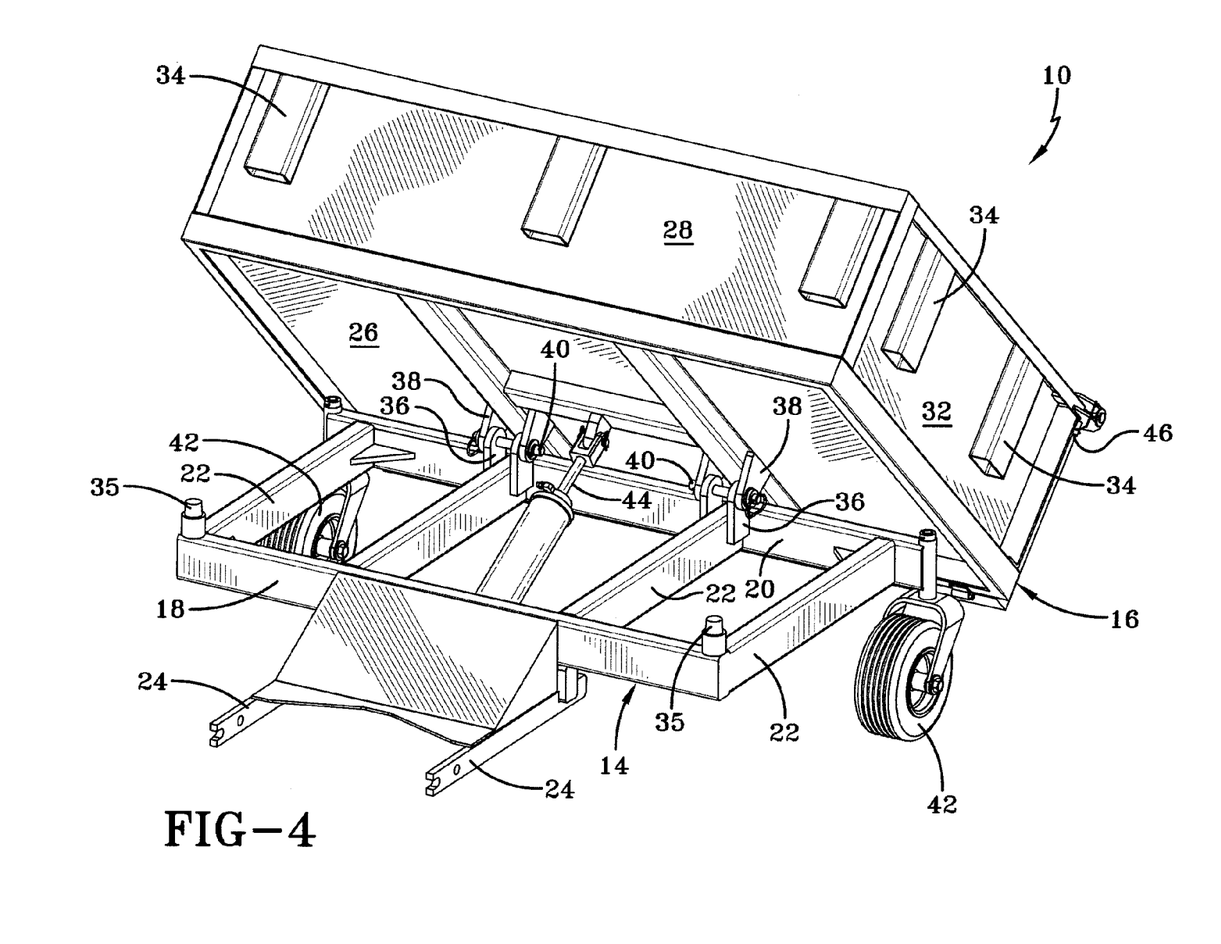
FIG. 4 is another perspective view of the hinge and dumping mechanism of the cargo hauling attachment.
Figure 5:
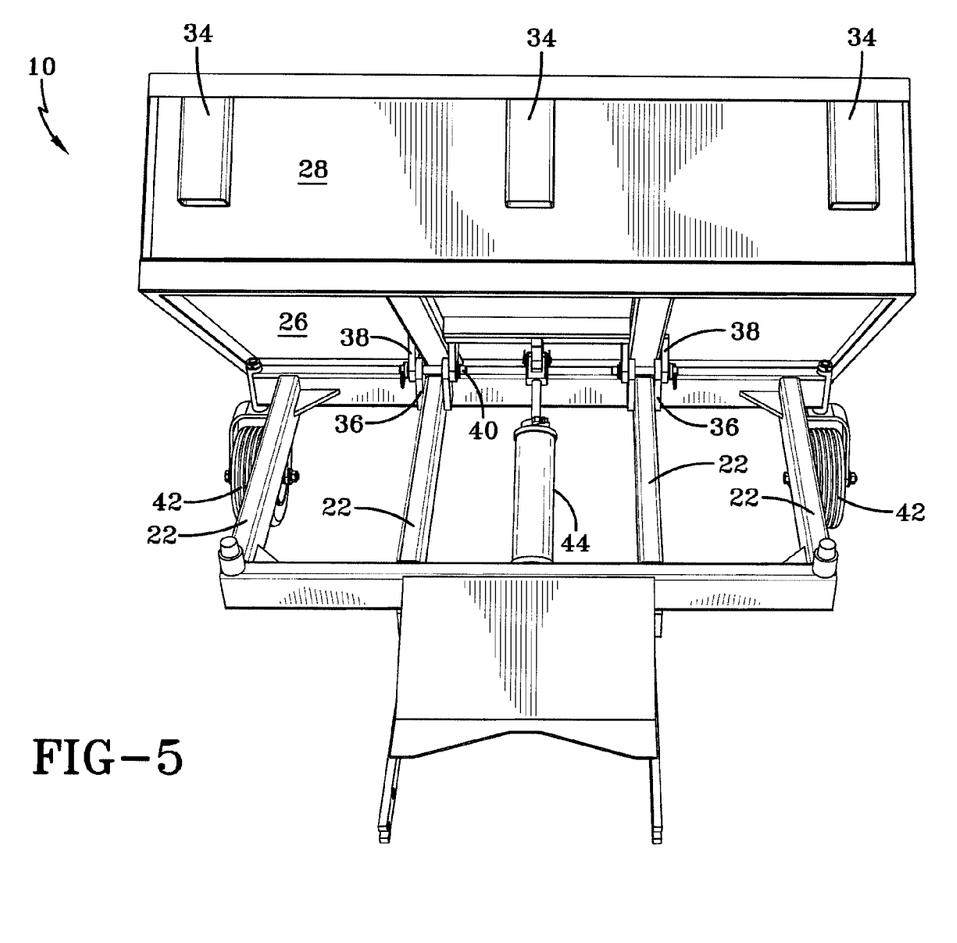
FIG. 5 is yet another perspective view of the hinge and dumping mechanism of the cargo hauling attachment.
Figure 6:
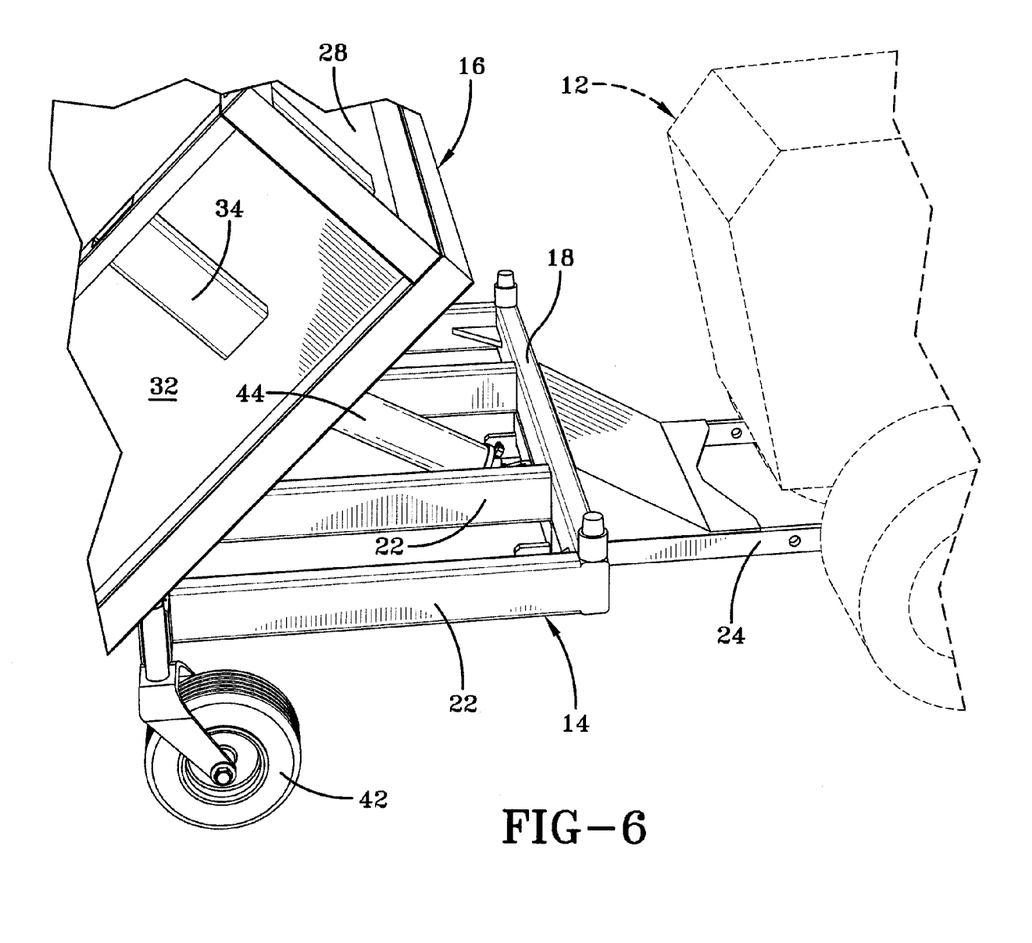
FIG. 6 is a side perspective view of the cargo hauling attachment in a dumping position.
Figure 7:
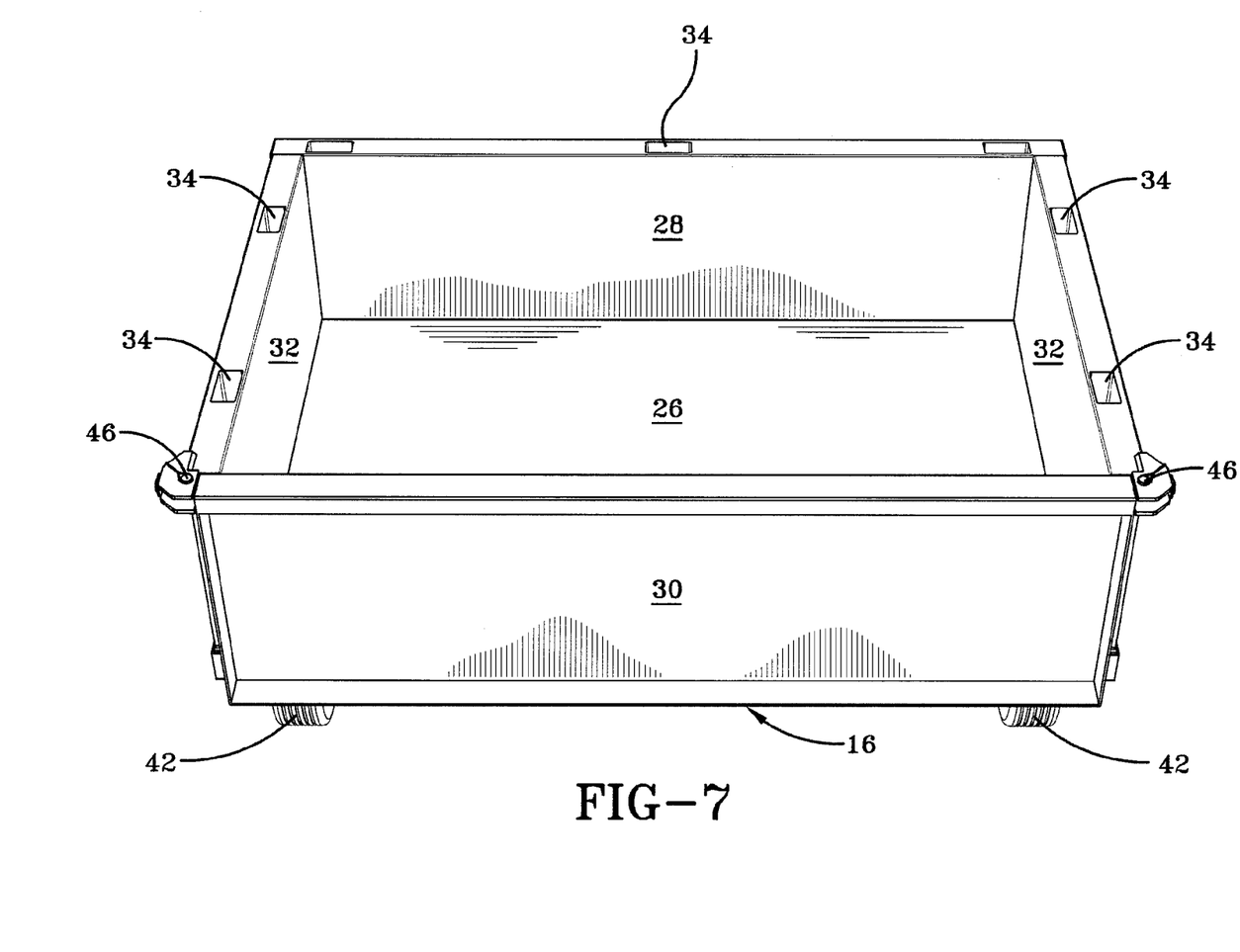
FIG. 7 is a front perspective view of the bed of the cargo hauling attachment.
Figure 8:
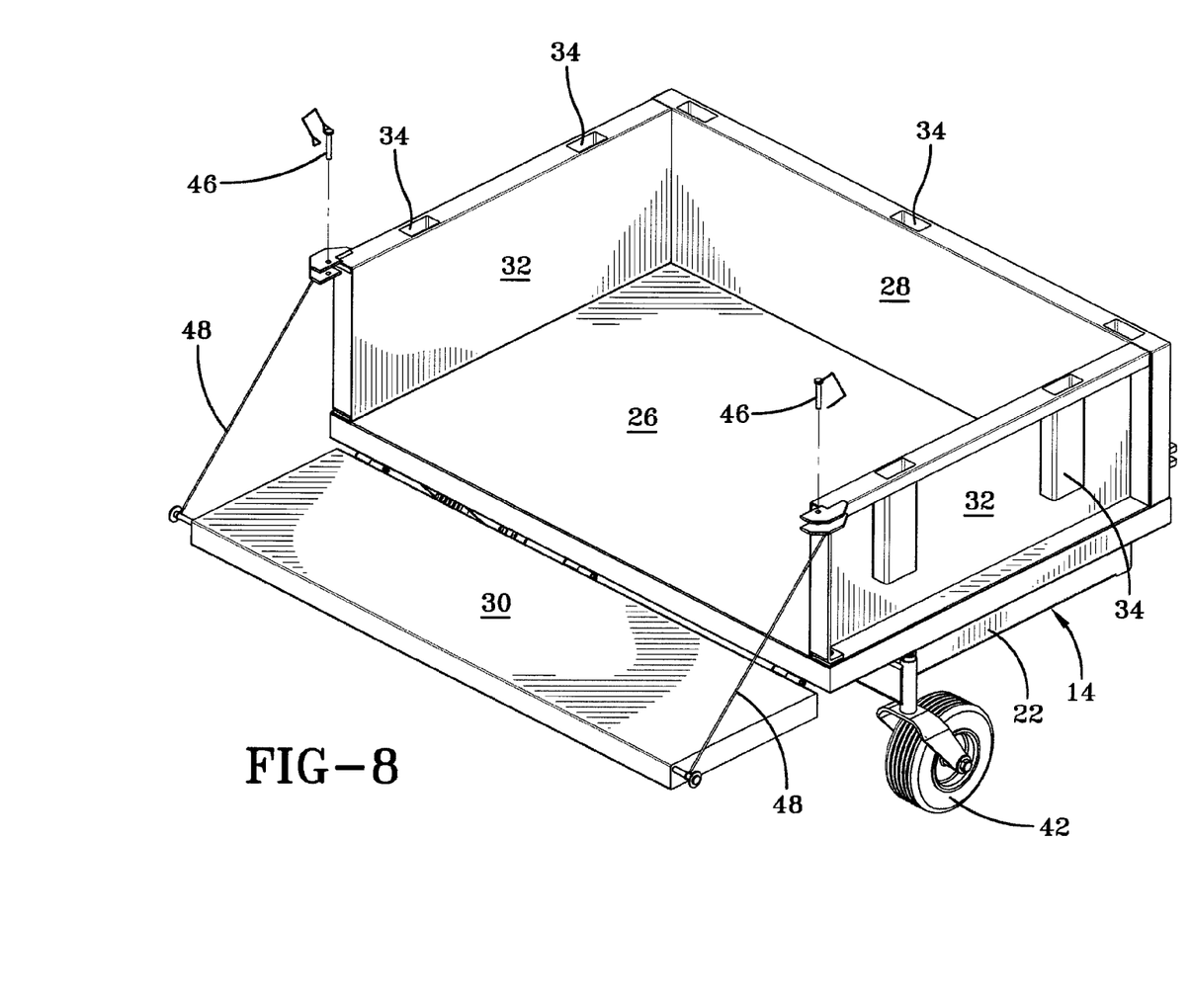
FIG. 8 is a perspective view of the cargo hauling attachment showing the lift gate in an open position.
Figure 9:
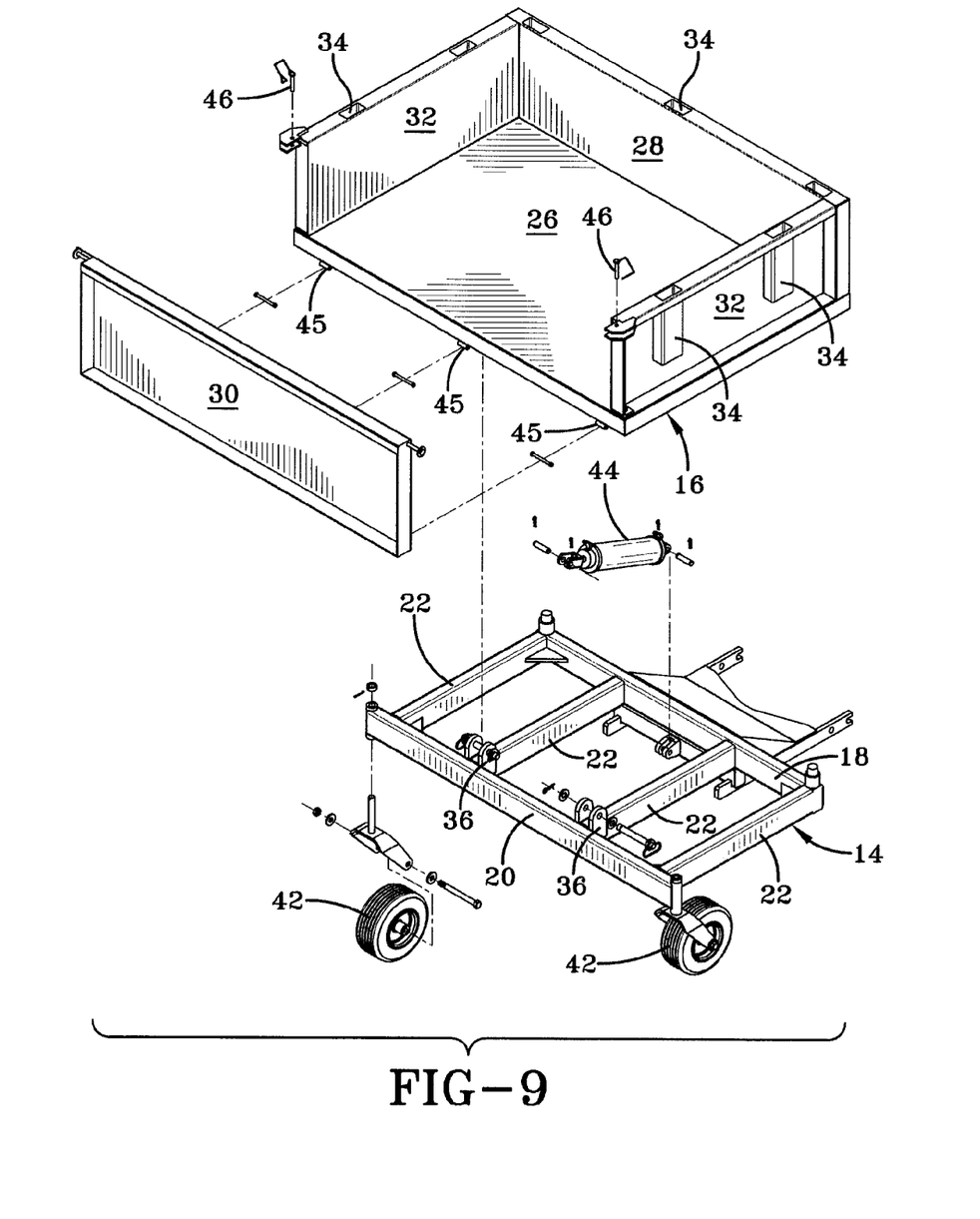
FIG. 9 is an exploded perspective view of the cargo hauling attachment of FIG. 1A.
Figure 10:
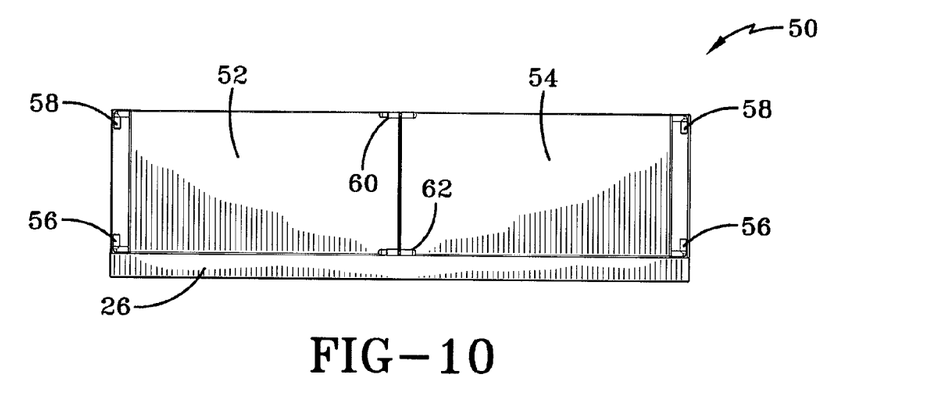
FIG. 10 is a front view of an alternative lift gate assembly according to the concepts of the present disclosure.
Figure 11:
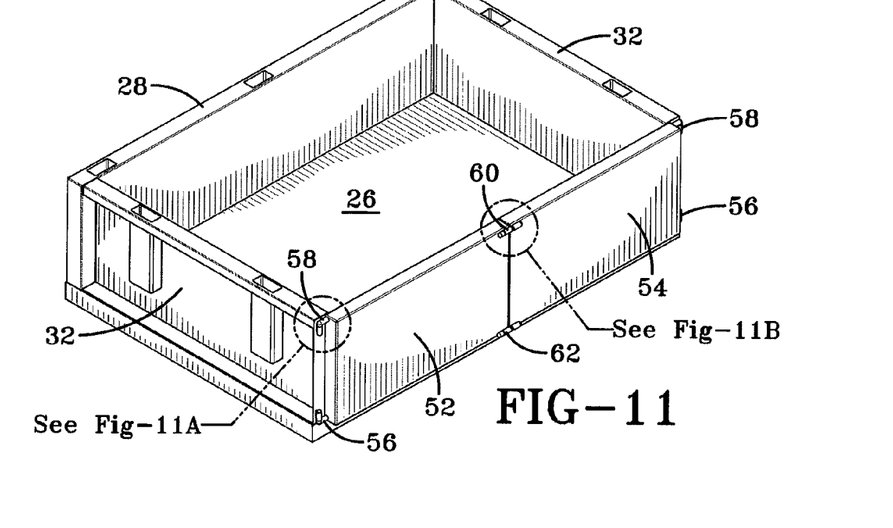
FIG. 11 is a perspective view of a cargo hauling attachment including the alternative lift gate assembly of FIG. 10.
Figure 11A:
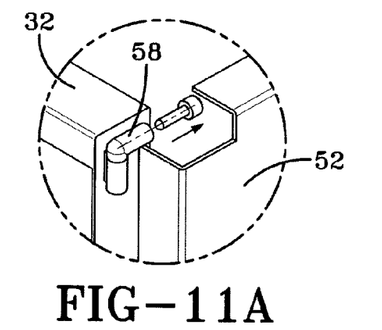
FIG. 11A is an enlarged view of a dual hinge according to the concepts of the present disclosure.
Figure 11B:
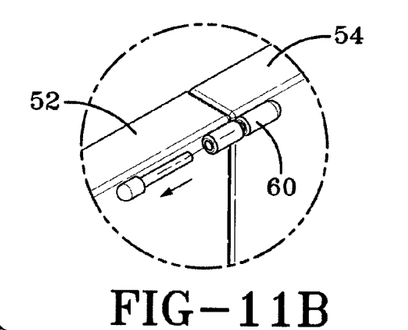
FIG. 11B is an enlarged view of a central pin assembly according to the concepts of the present disclosure.

In one or more embodiments, front wall 30 of bed 16 is provided in a form of a lift gate to facilitate dumping of cargo held within bed 16. Thus, front wall 30 is hingedly attached to the bottom 26 of bed 16 by one or more hinges 45 and is releasably secured to each of the side walls 32 by a removable pin 46. As will be appreciated by those skilled in the art, removal of removable pins 46 at each side wall 32 allows front wall 30 to pivot relative to bottom 26. Subsequent movement of bed 16 into a dumping position (FIG. 2) allows cargo within bed 16 to flow freely from cargo hauling attachment 10. In certain embodiments, and as shown in FIG. 8, stop members 48 may be provided to maintain the front wall 30 in a dumping position where the front wall is generally parallel to the bottom 26 of bed 16. Stop members 48 may be chains, cables, rope, or any other flexible and strong length of material suitable for holding the front wall 30 in position. As will be appreciated by those skilled in the art, when front wall 30 is closed and secured to side walls 32, stop members hang loosely within bed 16.

Figure 12:
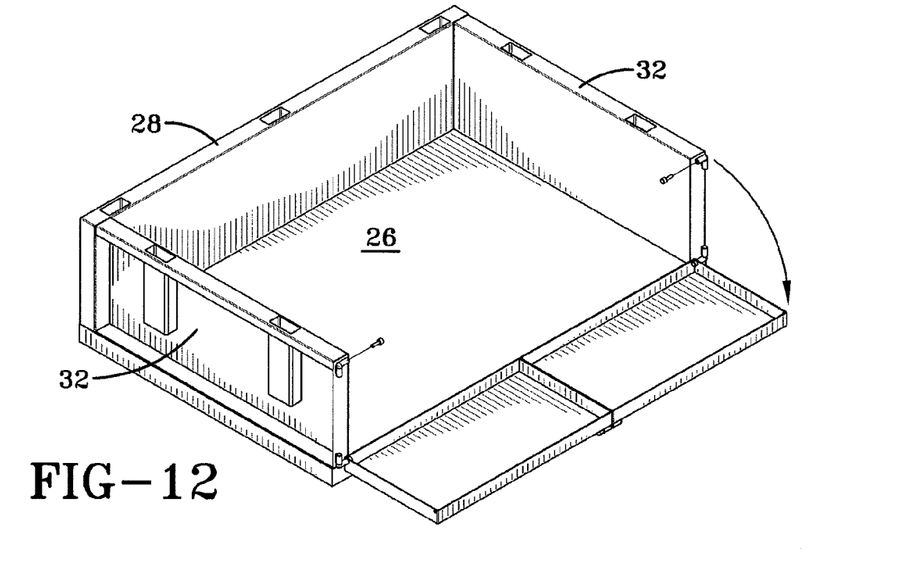
FIG. 12 is a perspective view of the lift gate assembly of FIG. 10 pivoted about bottom hinges.
Figure 13:
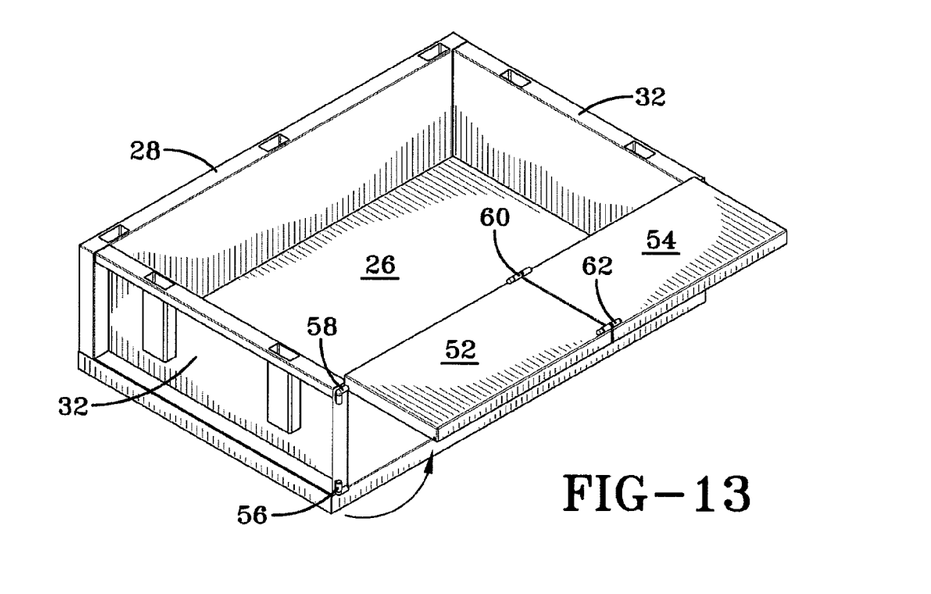
FIG. 13 is a perspective view of the lift gate assembly of FIG. 10 pivoted about upper hinges.

FIGS. 10-14 depict an alternative lift gate assembly contemplated for use with the cargo hauling attachment 10 and generally indicated by the numeral 50. Lift gate 50 includes a first portion 52 and a second portion 54 positioned adjacent to one another and together forming front wall 30 of bed 16. Lift gate 50 is connected to side walls 32 and bottom 26 of bed 16 by a plurality of dual motion hinges. A first pair of hinges 56 are provided at the bottom of first and second portions 52 and 54 between lift gate 50 and bottom surface 26. Hinges 56 allow lift gate 50 to swing downward as previously discussed, and as shown in FIG. 12. A second pair of hinges 58 is provided along a top edge of first and second portions 52 and 54 between lift gate 50 and sidewalls 32. This second pair of hinges allows lift gate 50 to pivot upwardly relative to bed 16, as shown in FIG. 13.

Figure 14:
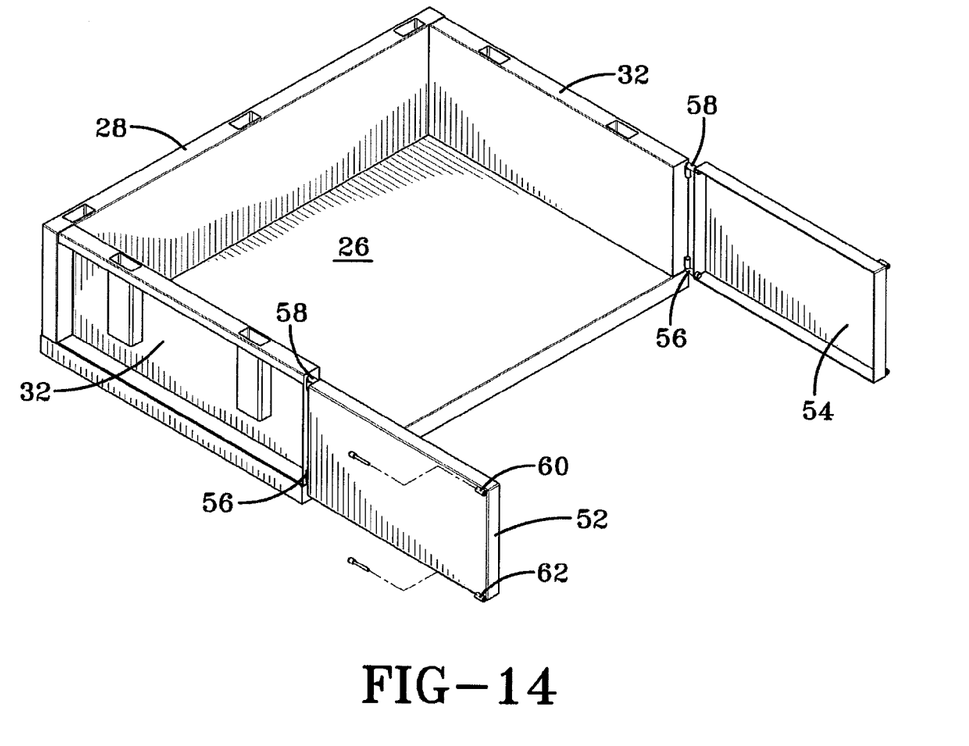
FIG. 14 is a perspective view of the lift gate assembly of FIG. 10 pivoted about side hinges.

Retaining pin assemblies 60 and 62 are provided at the center of lift gate 50 to secure first portion 52 to second portion 54. Pin assemblies 60 and 62 secure first and second portions 52 and 54 together unless lift gate 50 is to be opened by pivoting horizontally at hinges 56 and 58, as shown in FIG. 14. Each of the dual motion hinges is adapted to allow both horizontal and vertical pivoting motion of the lift gate 50. In certain embodiments, a pin may be provided through the lift gate 50 and may be received in the hinges 56, 58, removal of the pin allowing pivoting of the lift gate 50. Dual motion hinges are well known to those skilled in the art, and any suitable hinge may be used. An exemplary dual motion hinge suitable for use with the cargo hauling attachment of this disclosure is shown and described in U.S. Pat. No. 6,938,941, which is incorporated herein by reference for the purpose of teaching such a hinge.

The cargo hauling attachment 10 described herein, and shown in the drawings, alleviates several disadvantages associated with prior art systems. Attachment 10 is easily maneuvered by a driver of tractor 12 due to the rigid attachment between frame 14 and tractor 12 and the inclusion of freely rotating wheels 42. Furthermore, the positioning of attachment 10 at the front of tractor 12 allows a driver of the tractor to easily see where bed 16 is positioned. Also, lift gate 50 having multiple hinge assemblies allows for improved dumping in a forward direction. It is thus evident that a cargo hauling attachment constructed as described herein substantially improves the art.

What is claimed is:

1. A cargo hauling attachment for a vehicle comprising a frame, a bed connected to said frame, said bed having a bottom surface, a rear wall adjacent to a rear of said frame, side walls, and a front wall, said front wall being pivotable relative to said bottom surface and being secured to said side walls by removable pins to selectively prevent movement of said front wall relative to said bottom surface, mounting arms extending from said rear of said frame and configured for rigid attachment to the front of the vehicle so that said frame cannot pivot or turn relative to said vehicle, laterally spaced wheels secured to said frame, said wheels being rotatable about a vertical axis for providing maneuverability of the cargo hauling attachment, stop members secured to said front wall to maintain said front wall in a dumping position; and elastomeric bumpers positioned between said frame and said bed.

2. The cargo hauling attachment of claim 1, further comprising laterally spaced hinges connecting said front wall to said bottom surface of said bed.

3. The cargo hauling attachment of claim 1, said bed being pivotable relative to said frame for dumping of cargo within the cargo hauling attachment.

4. The cargo hauling attachment of claim 3, said bed being pivotally secured to said frame by one or more hinges positioned adjacent to a front end of said frame opposite said rear of said frame for forward dumping.

5. The cargo hauling attachment of claim 3, further comprising a linear actuator connected at one end to said frame and at an opposite end to said bed for pivoting said bed relative to said frame.

6. The cargo hauling attachment of claim 5, said linear actuator being a hydraulic linear actuator having a high pressure hydraulic fluid source.

7. The cargo hauling attachment of claim 6, said high pressure hydraulic fluid source being a hydraulic system of a tractor to which the cargo hauling attachment is connected.

\* \* \* \* \*